(12) United States Patent
Ueda et al.

(10) Patent No.: US 10,982,118 B2
(45) Date of Patent: Apr. 20, 2021

(54) RELEASE FILM

(71) Applicant: Oji Holdings Corporation, Tokyo (JP)

(72) Inventors: Hiroaki Ueda, Tokyo (JP); Yoshio Mizuhara, Tokyo (JP); Takuji Nakagawa, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 16/480,951

(22) PCT Filed: Feb. 14, 2018

(86) PCT No.: PCT/IB2018/000105
§ 371 (c)(1),
(2) Date: Jul. 25, 2019

(87) PCT Pub. No.: WO2018/150255
PCT Pub. Date: Aug. 23, 2018

(65) Prior Publication Data
US 2019/0390088 A1 Dec. 26, 2019

(30) Foreign Application Priority Data

Feb. 14, 2017 (JP) .............................. JP2017-024853

(51) Int. Cl.
| | | |
|---|---|---|
| *C09J 7/40* | (2018.01) | |
| *C09J 7/38* | (2018.01) | |
| *B32B 7/06* | (2019.01) | |
| *B32B 7/12* | (2006.01) | |
| *B32B 27/32* | (2006.01) | |
| *B32B 27/36* | (2006.01) | |

(52) U.S. Cl.
CPC ................. *C09J 7/401* (2018.01); *B32B 7/06* (2013.01); *B32B 7/12* (2013.01); *B32B 27/32* (2013.01); *B32B 27/36* (2013.01); *C09J 7/38* (2018.01); *C09J 7/405* (2018.01); *B32B 2255/10* (2013.01); *B32B 2255/26* (2013.01); *B32B 2405/00* (2013.01); *C09J 2301/414* (2020.08); *C09J 2451/005* (2013.01); *C09J 2467/005* (2013.01); *Y10T 428/1457* (2015.01); *Y10T 428/1476* (2015.01)

(58) Field of Classification Search
None
See application file for complete search history.

(56) References Cited

U.S. PATENT DOCUMENTS

| | | |
|---|---|---|
| 2004/0126576 A1 | 7/2004 | Kinning et al. |
| 2009/0202772 A1 | 8/2009 | Vanderzanden et al. |
| 2013/0059105 A1* | 3/2013 | Wright ................ C09D 183/06 428/41.8 |
| 2015/0104738 A1 | 4/2015 | Takagi et al. |
| 2017/0226385 A1* | 8/2017 | Hiraki ................... C09J 133/04 |

FOREIGN PATENT DOCUMENTS

| | | |
|---|---|---|
| JP | S5813664 A | 1/1983 |
| JP | H02-251555 A | 10/1990 |
| JP | H02-308806 A | 12/1990 |
| JP | 2003080638 A | 3/2003 |
| JP | 2014152275 A | 8/2014 |
| JP | 2016135567 A | 7/2016 |
| WO | 2014083851 A1 | 6/2014 |

OTHER PUBLICATIONS

Matsumoto, Makoto et al., "Polyfluoroolefin Polyorganosiloxane Graft Copolymer and Production Thereof", machine translation of JP02-308806A, Dec. 21, 1990 (Year: 1990).*
Yoshida, Sandanori et al., "Fluorine-Containing Resin Composition", machine translation of JP02-251555A, Oct. 9, 1990 (Year: 1990 ).*
Koizumi, Atsushi et al., "A Strippable Film Coating Forming Agent for Silicone Adhesives", English translation of JPS58-013664A, Jan. 26, 1983 (Year: 1983).*
PCT, International Preliminary Report on Patentability for the corresponding application No. PCT/IB2018/000105, dated Aug. 20, 2019, with English translation (12 pages).
International Search Report dated Jun. 5, 2018 for PCT/IB2018/000105 and English translation.
CNIPA, Office Action for the corresponding Chinese Patent Application No. 201880008723.2, dated Oct. 20, 2020, with English translation.
EPO, Extended European Search Report for the corresponding European Patent Application No. 18754850.8, dated Nov. 16, 2020.

* cited by examiner

*Primary Examiner* — Anish P Desai
(74) *Attorney, Agent, or Firm* — Lucas & Mercanti, LLP

(57) ABSTRACT

The present invention provides a release film having good releasability such that a release force is light, and also suppresses silicone transfer from the film surface. The present invention relates to a release film having a surface layer on a substrate layer, in which a main component of the surface layer is a resin component, the resin component contains a modified acrylic-based resin having a polysiloxane component, and a relationship between a ratio $M_T$ of a content of silicon to a content of all elements existing on an outermost surface of the surface layer and a ratio $M_B$ of a content of silicon to a content of all elements existing at a position in a depth of 10 nm from the outermost surface of the surface layer vertically toward the substrate layer satisfies (i) $5 \leq M_T/M_B \leq 30$ or (ii) $M_B = 0$, and $8.5 \leq M_T \leq 30$.

5 Claims, 2 Drawing Sheets

RELEASE FILM

CROSS REFERENCE TO RELATED APPLICATION

This application is a National Phase of PCT/IB2018/000105 filed on Feb. 14, 2018, which, in turn, claimed the priority of Japanese Patent Application No. 2017-024853 which was filed on Feb. 14, 2017, both applications are incorporated herein by reference.

TECHNICAL FIELD

The present invention relates to a film having excellent releasability. Particularly, the present invention relates to a film for release or the like that is used, for example, in a step of manufacturing an electronic part or an electronic substrate, a step of manufacturing a thermosetting resin member such as a fiber-reinforced plastic, or the like, in medical field and industrial field. More specifically, the present invention relates to a release film that is particularly useful as a release film used in a surface protective film, a pressure-sensitive adhesive tape, and the like; a release liner or a separator film; a separator of a step (dicing, die bonding, back grind) tape used during manufacturing of a semiconductor product; a carrier for forming an unbaked sheet during manufacturing of a ceramic capacitor, as well as a carrier during manufacturing of a composite material, a separator film of a protective material, or the like.

Background Technology

A silicone-based release film is excellent in weather resistance, heat resistance, cold resistance, chemical resistance, and electrical insulating properties, and is widely used as a release film. However, when the silicone-based release film is used, silicone may be transferred to an article to which the relevant film is attached (this problem is also referred to as a problem of silicone transfer). Therefore, change in the composition of silicone in the silicone-based release film, extreme suppression of a use amount of silicone, or no use of silicone has been studied. For example, Patent Document 1 proposes a release film that contains, as a main resin, polydimethylsiloxane containing a vinyl group or a hexenyl group, and suppresses a coating amount to 0.07 g/m² or less to decrease transfer of silicone. Furthermore, Patent Document 2 describes a release film excellent in heat resistance and electrical insulating properties, which is obtained by using, as a coating agent, a composition containing a copolymer including, as a non-silicone-based material, a constituent unit derived from 4-methyl-1-pentene and a constituent unit derived from propylene.

DOCUMENTS OF RELATED ART

Patent Documents

Patent Document 1: Japanese Unexamined Patent Application, First Publication No. 2003-080638.
Patent Document 2: Japanese Unexamined Patent Application, First Publication No. 2016-135567.

SUMMARY OF THE INVENTION

Problem to be Solved by the Invention

However, the release film described in Patent Document 1 contains a polysiloxane component as a main component, so that even when the film is made to be extremely thin, the affinity with a film substrate is low, and reduction in silicone transfer is insufficient. Particularly, when an adherend (article) to which the release film is attached is a surface protective film, the relevant release film is, for example, a film that is stored, distributed, and the like in the state where the film is attached to a surface to be attached such as a pressure-sensitive adhesive surface of the surface protective film, and is released from the surface to be attached when the surface protective film or the like is used. Hence, silicone existing in the release film may be transferred to the surface to be attached of the surface protective film. In this case, when the surface protective film in which silicone has been transferred to the relevant surface to be attached is used by further being attached to a surface of another adherend (another article), part of the transferred silicone component may be transferred to the above-mentioned other adherend (other article).

Furthermore, in the film described in Patent Document 2 in which as a coating agent a composition containing a copolymer including, as a non-silicone-based material, a constituent unit derived from 4-methyl-1-pentene and a constituent unit derived from propylene is used, the releasability is insufficient.

Then, there is still a demand for a release film having good releasability such that a release force is light, and also suppresses silicone transfer from the film surface.

An object of the present invention is to provide a release film having good releasability such that a release force is light, and also suppresses silicone transfer from the film surface.

Means for Solving the Problem

In order to achieve the above-mentioned object, the present inventors have continued to study a release film in detail and completed the present invention.

That is, the present invention includes the following preferable aspects.

[1] A release film comprising a surface layer on a substrate layer, wherein
a main component of the surface layer is a resin component,
the resin component contains a modified acrylic-based resin having a polysiloxane component, and
a relationship between a ratio $M_T$ (atomic %) of a content of silicon to a content of all elements existing on an outermost surface of the surface layer and a ratio $M_B$ (atomic %) of a content of silicon to a content of all elements existing at a position in a depth of 10 nm from the outermost surface of the surface layer vertically toward the substrate layer satisfies (1) and (2) below:

$$(i)\ 5 \le M_T/M_B \le 30\ or\ (ii)\ M_B=0,\ and \quad (1)$$

$$8.5 \le M_T \le 30. \quad (2)$$

[2] The release film according to [1], wherein a main component of the substrate layer is at least one kind of a resin selected from the group consisting of a polyolefin resin and a polyester resin.
[3] The release film according to [1] or [2], wherein the $M_T$ satisfies $9 \le M_T \le 16$.
[4] The release film according to any one of [1] to [3], which is used for a separator film or a carrier film.
[5] A laminate comprising at least a pressure-sensitive adhesive layer formed on the surface layer of the release film according to any one of [1] to [4].

[6] Use of a release film comprising a surface layer on a substrate layer, wherein
the release film is released from a laminate including at least a pressure-sensitive adhesive layer formed on the surface layer of the release film, at an interface between the surface layer and the pressure-sensitive adhesive layer,
a main component of the surface layer is a resin component,
the resin component contains a modified acrylic-based resin having a polysiloxane component, and
a relationship between a ratio $M_T$ (atomic %) of a content of silicon to a content of all elements existing on an outermost surface of the surface layer and a ratio $M_B$ (atomic %) of a content of silicon to a content of all elements existing at a position in a depth of 10 nm from the outermost surface of the surface layer vertically toward the substrate layer satisfies (1) and (2) below:

(i) $5 \leq M_T/M_B \leq 30$ or (ii) $M_B=0$, and  (1)

$8.5 \leq M_T \leq 30$.  (2)

[7] The use of a release film according to [6], wherein the release film is used as a separator film or a carrier film.

Effects of Invention

The release film of the present invention has good releasability such that a release force is light, and hardly transfers a silicone component. For this reason, particularly, it is suitable as a release film or the like used in a step of manufacturing an electronic part or an electronic substrate, a step of manufacturing a thermosetting resin member such as a fiber-reinforced plastic, or the like.

BRIEF DESCRIPTION OF THE DRAWINGS

FIG. 3 schematically shows that a laminate 20 according to the present embodiment includes a release film 10 having a surface layer 2 on a substrate layer 1, and an adherend 30 having a pressure-sensitive adhesive layer 4.
FIG. 4 schematically shows that a laminate 20 according to the present embodiment includes a release film 10 having an intermediate layer 3 and a surface layer 2 on a substrate layer 1, and an adherend 30 having a pressure-sensitive adhesive layer 4.

BEST MODE FOR CARRYING OUT THE INVENTION

Figure 1:
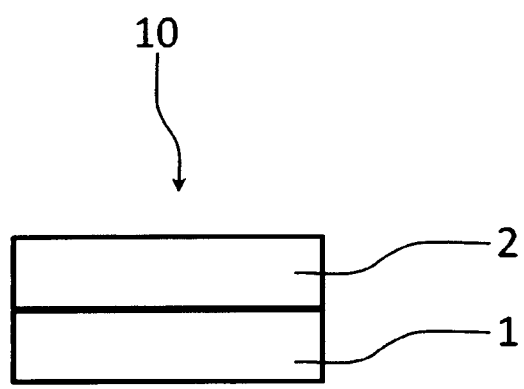
FIG. 1 is a cross-sectional view schematically showing a release film according to the present embodiment.
Figure 2:
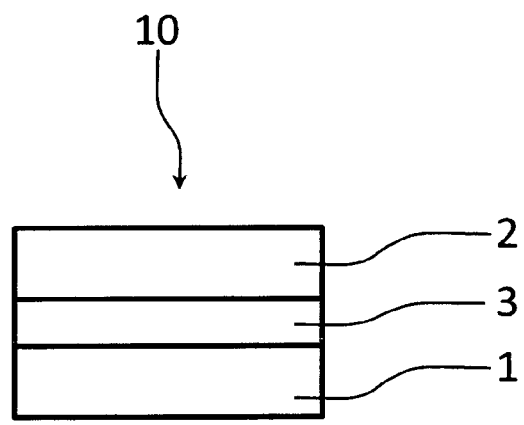
FIG. 2 is a cross-sectional view schematically showing the release film according to the present embodiment.
Figure 3:
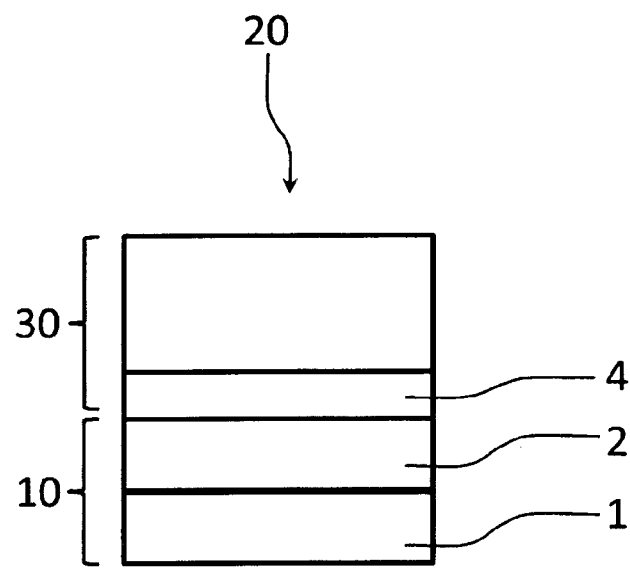
FIG. 3 is a cross-sectional view schematically showing a laminate according to the present embodiment.
Figure 4:
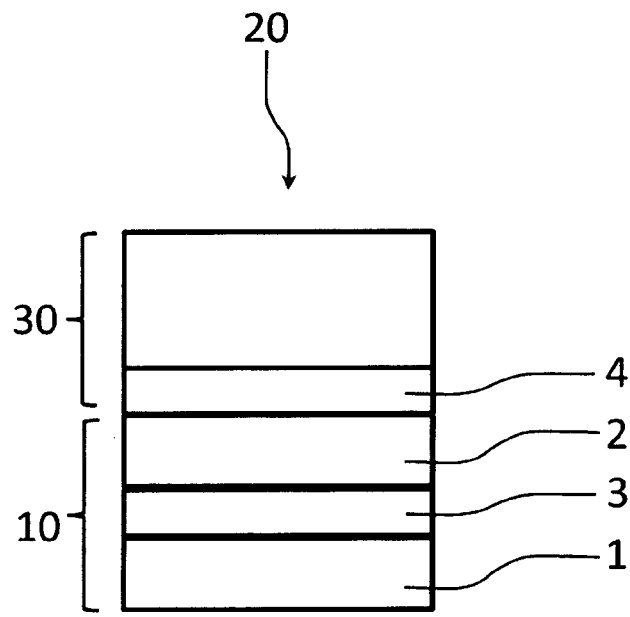
FIG. 4 is a cross-sectional view schematically showing the laminate according to the present embodiment.

Embodiments of the present invention will be described in detail below. It is to be noted that the scope of the present invention is not limited to the embodiments described herein, but can be variously changed in a range without departing from the spirit of the present invention.
<<Release Film>>
The release film of the present embodiment is a release film having a surface layer on a substrate layer, and is characterized in that a main component of the surface layer is a resin component, the resin component contains a modified acrylic-based resin having a polysiloxane component, and a relationship between a ratio $M_T$ (atomic %) of a content of silicon to a content of all elements existing on an outermost surface of the surface layer and a ratio $M_B$ (atomic %) of a content of silicon to a content of all elements existing at a position in a depth of 10 nm from the outermost surface of the surface layer vertically toward the substrate layer satisfies (1) and (2) below:

$5 \leq M_T/M_B \leq 30$ or $M_B=0$, and  (1)

$8.5 \leq M_T \leq 30$.  (2)

The relevant release film includes both (1) the effect of good releasability (that is, when a subject (adherend such as surface protective film) is attached to a surface layer of the relevant release film, or the above-mentioned subject has been attached to a surface layer of the release film in advance, and then peeling is conducted between the relevant surface layer and the relevant subject, a release force is low while the relevant release force is present between the relevant surface layer and the relevant subject (hereinafter, this property is also referred to as a release force being light)) and (2) the effect that a silicone component is hardly transferred to the above-mentioned subject attached to a surface layer of the relevant release film. Particularly, in the above-mentioned effect of (1), the release film of the present embodiment has goodness equivalent to that of the releasability of a normal silicone-based release film. Since the release film of the present embodiment has both the above-mentioned effects of (1) and (2), the relevant release film of the present embodiment is suitably used as a release film or the like used in a step of manufacturing an electronic part or an electronic substrate, a step of manufacturing a thermosetting resin member such as a fiber-reinforced plastic, or the like.

The release film of the present embodiment is a film having a substrate layer, and a surface layer on at least one side of the substrate layer.
[Substrate Layer]
The substrate layer is a layer containing, for example, a polyester-based resin such as polyethylene terephthalate, polybutylene terephthalate, polyethylene naphthalate, polypropylene terephthalate, polypropylene naphthalate, polytrimethylene terephthalate or polybutylene terephthalate; a polyolefin-based resin such as polyethylene or polypropylene; a polystyrene-based resin; an acetylcellulose-based resin such as triacetylcellulose; an acrylic-based resin such as polymethyl methacrylate; a polyurethane resin; a polycarbonate resin; a polyamide-based resin; a polyvinyl chloride-based resin; or the like. The substrate layer may contain only one kind of the above-mentioned resins, or may contain a combination of two or more kinds of them. The substrate layer in the release film of the present embodiment is preferably a layer containing a resin component as a main component from the viewpoint of processing suitability of the surface layer, more preferably a layer containing, as a main component, at least one kind selected from the group consisting of a polyester-based resin, a polyolefin-based resin, and a polystyrene-based resin, further preferably a layer containing, as a main component, at least one kind selected from the group consisting of a polyester-based resin and a polyolefin-based resin from the viewpoint of adhesion with the surface layer (and also adhesion with another layer when the relevant another layer intervenes between the surface layer and the substrate layer) and suppression of transfer of a silicone component from the surface layer to a subject (adherend), still further preferably a layer containing a polyester-based resin as a main component, and particularly preferably a layer containing a polyethylene terephthalate resin as a main component. Herein, in the present invention and the present specification, the main component means a component that is contained in each layer at 50% by mass or more, preferably 70% by mass or more, more preferably 80% by mass or more, further preferably 90% by mass or more, and particularly preferably 95% by mass or more. A component that is to be the relevant main component may also be 100% by mass.

The substrate layer may contain an additive, similar to the surface layer described later. Since the kind and component of the additive will be described in an item of the surface layer described later, description is omitted herein.

The substrate layer may be a layer that is formed of any of a non-stretched film, a monoaxially-stretched film, and a biaxially-stretched film. From the viewpoint of processing suitability, transparency, and dimensional stability, it is preferable that the substrate layer is a layer formed of a biaxially-stretched film. The substrate layer may be formed of a monolayer or may be formed of a multilayer. When the substrate layer is formed of a multilayer, it is preferable that resins constituting the respective layers in the relevant multilayer are identical.

The thickness of the substrate layer is preferably 15 µm or more, and more preferably 20 µm or more from the viewpoint of processing suitability. The thickness of the substrate layer is preferably 125 µm or less, and more preferably 50 µm or less from the viewpoint of handleability during use of a product. The thickness of the substrate layer is measured using a micrometer (JIS B-7502) in accordance with JIS C-2151.

For the purpose of enhancing adhesion between the substrate layer and the surface layer described later, one surface or both surfaces of the substrate layer may be optionally surface-treated. Examples of the surface treatment include roughening treatment such as sand blast treatment or solvent treatment; surface oxidation treatment such as corona discharge treatment, plasma treatment, chromic acid treatment, flame treatment, hot air treatment or ozone/ultraviolet irradiation treatment; and the like.

[Surface Layer]

The release film of the present embodiment includes the surface layer on the above-mentioned substrate layer. The surface layer is a layer for giving the releasability to the release film of the present embodiment. The surface layer may be formed on the substrate layer with a layer such as an adhesive layer (or intermediate layer) interposed between the surface layer and the substrate layer. It is preferable that in the release film of the present embodiment, the surface layer is formed so that a principal surface of the surface layer comes into contact with a principal surface of the substrate layer. That is, it is preferable that the release film of the present embodiment is composed of a laminate including two kinds of layers of the substrate layer and the surface layer. The release film of the present embodiment is attached so that the surface layer comes into contact with an adherend (article), and is used so that peeling is finally conducted at an interface between the surface layer and the adherend (article). Herein, the above-mentioned adherend has suitably a pressure-sensitive adhesive layer.

<(a) Modified Acrylic-Based Resin Having Polysiloxane Component>

The main component of the surface layer is a resin component, and the above-mentioned resin component contains a modified acrylic-based resin having a polysiloxane component (also referred to as a polysiloxane structure). The modified acrylic-based resin having a polysiloxane component is a resin having an acrylic-based resin as a main chain and a polysiloxane component as a side chain.

As the above-mentioned (a) modified acrylic-based resin having a polysiloxane component, the following resin (I) or (II) can be suitably used. The above-mentioned modified acrylic-based resin having a polysiloxane component can be used alone or in combination of two or more kinds thereof.

(I) A polymer obtained by polymerizing at least a monomer a having a carbon-carbon unsaturated double bond and a polyorganosiloxane chain in one molecule.

(II) A polymer in which a polysiloxane component is graft-polymerized to a polymer obtained by polymerizing at least an acrylic-based monomer b having a carbon-carbon unsaturated double bond in one molecule.

Description of Resin (I)

The resin (I) in the modified acrylic-based resin having a polysiloxane component is a polymer obtained by polymerizing at least (A) a monomer a having a carbon-carbon unsaturated double bond and a polyorganosiloxane chain in one molecule. It is preferable that the relevant modified acrylic-based resin is a polymer obtained by polymerizing (B) an acrylic-based monomer b having a carbon-carbon unsaturated double bond in one molecule together with the above-mentioned monomer a. Furthermore, it is more preferable that the resin is a polymer obtained by polymerizing (C) a monomer c having a carbon-carbon unsaturated double bond and a crosslinking functional group in one molecule and/or (D) a monomer d having a carbon-carbon unsaturated double bond in one molecule together with the above-mentioned monomer a and the above-mentioned monomer b.

[(A) Monomer a]

Examples of (A) the monomer a having a carbon-carbon unsaturated double bond and a polyorganosiloxane chain in one molecule include a both terminal vinyl group-containing polysiloxane compound, a one terminal vinyl group-containing polysiloxane compound, a one terminal (meth)acryloxy group-containing polysiloxane compound, a both terminal methacrylic functional siloxane oligomer, and the like. Examples of the both terminal vinyl group-containing polysiloxane compound include Silaplane FM-2231, FM-2241, FM-2242, FP-2231, FP-2241, FP-2242 manufactured by JNC Co., Ltd.; XF40-A1987, TSL9706, TSL9646, TSL9686 manufactured by Momentive Performance Materials Japan LLC; and the like. Examples of the one terminal vinyl group-containing polysiloxane compound include TSL9705 manufactured by Toshiba Silicone Co., Ltd., and the like. Examples of the one terminal (meth)acryloxy group-containing polysiloxane compound include Silaplane FM-0711, FM-0721, FM-0725 manufactured by JNC Co., Ltd. and the like. In the present invention and the present specification, "(meth)acryloxy" means "acryloxy or methacryloxy". The above-mentioned monomer a may be used alone or in combination of two or more kinds thereof.

[(B) Monomer b]

Examples of (B) the acrylic-based monomer b having a carbon-carbon unsaturated double bond in one molecule suitably include a (meth)acrylic acid derivative. Examples of the (meth)acrylic acid derivative include methyl (meth)acrylate, butyl (meth)acrylate, n-octyl (meth)acrylate, nonyl (meth)acrylate, isodecyl (meth)acrylate, lauryl (meth)acrylate, stearyl (meth)acrylate, ethylhexyl (meth)acrylate, benzyl (meth)acrylate, a (meth)acrylic acid salt, (meth)acrylonitrile, and the like. In the present invention and the present specification, "(meth)acryl" means "acryl or methacryl", and "(meth)acrylate" means "acrylate or methacrylate". The above-mentioned monomer b may be used alone or in combination of two or more kinds thereof.

[(C) Monomer c]

Examples of the crosslinking functional group in (C) the monomer c having a carbon-carbon unsaturated double bond and a crosslinking functional group in one molecule include a carboxyl group, an isocyano group, an epoxy group, an N-methylol group, an N-alkoxymethyl group, a hydroxy group, a hydrolyzable silyl group, and the like. The above-mentioned monomer c may be used alone or in combination of two or more kinds thereof.

Examples of the monomer c having a carboxyl group include acrylic acid, methacrylic acid, crotonic acid, itaconic acid, maleic acid, styrene sulfonic acid, and the like.

Examples of the monomer c having an isocyano group include (meth)acryloyloxyethyl isocyanate, (meth)acryloyloxypropyl isocyanate, and the like, and also include those obtained by reacting hydroxy(meth)acrylate (for example, 2-hydroxyethyl (meth)acrylate, 4-hydroxybutyl (meth)acrylate, and the like) with polyisocyanate (for example, toluene diisocyanate, isophorone diisocyanate, Coronate L, and the like).

Examples of the monomer c having an epoxy group include glycidyl methacrylate, glycidyl cinnamate, glycidyl allyl ether, glycidyl vinyl ether, vinylcyclohexane monoepoxide, 1,3-butadiene monoepoxide, and the like.

Examples of the monomer c having an N-methylol group or an N-alkoxymethyl group include (meth)acrylamides having an N-monoalkoxymethyl group such as N-methylol (meth)acrylamide, N-methoxymethyl(meth)acrylamide, N-ethoxymethyl(meth)acrylamide, N-propoxymethyl(meth)acrylamide, and N-butoxymethyl(meth)acrylamide; (meth)acrylamides having an N,N-dialkoxymethyl group such as N,N-dimethylol(meth)acrylamide, N,N-di(methoxymethyl)(meth)acrylamide, N,N-di(ethoxymethyl)(meth)acrylamide, N,N-di(propoxymethyl)(meth)acrylamide, and N,N-di(butoxymethyl)(meth)acrylamide; and the like.

Examples of the monomer c having a hydroxy group include 2-hydroxyethyl (meth)acrylate, 1-hydroxypropyl (meth)acrylate, 2-hydroxypropyl (meth)acrylate, 4-hydroxybutyl (meth)acrylate, polyethylene glycol mono(meth)acrylate, polypropylene glycol mono(meth)acrylate, polytetramethylene glycol mono(meth)acrylate, hydroxystyrene, and the like.

Examples of the monomer c having a hydrolyzable silyl group include (meth)acryloxyalkylalkoxysilanes such as γ-(meth)acryloxypropyltrimethoxysilane and γ-(meth)acryloxypropylmethyldimethoxysilane, (meth)acryloxyalkylalkoxyalkylsilane, trimethoxyvinylsilane, climethoxyethylsilane, triethoxyvinylsilane, triethoxyallylsilane, vinylmethyldimethoxysilane, vinylmethyldiethoxysilane, vinyltris(2-methoxyethoxy)silane, and the like.

The monomer c having a carbon-carbon unsaturated double bond and a crosslinking functional group in one molecule is preferably at least one kind selected from the group consisting of 2-hydroxyethyl (meth)acrylate, 1-hydroxypropyl (meth)acrylate, 2-hydroxypropyl (meth)acrylate, 4-hydroxybutyl (meth)acrylate, polyethylene glycol mono(meth)acrylate, polypropylene glycol mono(meth)acrylate, polytetramethylene glycol mono(meth)acrylate, and hydroxystyrene.

[(D) Monomer d]

Examples of (D) the monomer d having a carbon-carbon unsaturated double bond in one molecule include monomers having a carbon-carbon unsaturated double bond in one molecule other than the monomer b (that is, other than (B) the acrylic-based monomer b having a carbon-carbon unsaturated double bond in one molecule). Specific examples of the above-mentioned monomer d include (i) an aromatic vinyl monomer, (ii) an olefin-based hydrocarbon monomer, (iii) a vinyl ester monomer, (iv) a vinyl halide monomer, (v) a vinyl ether monomer, and the like. The above-mentioned monomer d may be used alone or in combination of two or more kinds thereof.

Examples of the aromatic vinyl monomer include styrene, methylstyrene, ethylstyrene, chlorostyrene, styrenes in which a part of hydrogen(s) is (are) substituted with fluorine(s) (for example, monofluoromethylstyrene, difluoromethylstyrene, trifluoromethylstyrene, and the like), and the like.

Examples of the olefin-based hydrocarbon monomer include ethylene, propylene, butadiene, isobutylene, isoprene, 1,4-pentadiene, and the like.

Examples of the vinyl ester monomer include vinyl acetate and the like.

Examples of the vinyl halide monomer include vinyl chloride, vinylidene chloride, monofluoroethylene, difluoroethylene, trifluoroethylene, and the like.

Examples of the vinyl ether monomer include vinyl methyl ether and the like.

Description of Resin (II)

The resin (II) in the modified acrylic-based resin having a polysiloxane component is a polymer in which a polysiloxane component is graft-polymerized to a polymer obtained by polymerizing at least an acrylic-based monomer b having a carbon-carbon unsaturated double bond in one molecule.

As the above-mentioned acrylic-based monomer b, a monomer that is similar to the monomer b in the description of the above-mentioned resin (I) can be used. For this reason, herein, description of the acrylic-based monomer b is omitted.

It is preferable that the relevant modified acrylic-based resin is a polymer obtained by polymerizing (C) a monomer c having a carbon-carbon unsaturated double bond and a crosslinking functional group in one molecule and/or (D) a monomer d having a carbon-carbon unsaturated double bond in one molecule together with the above-mentioned monomer b. As the above-mentioned monomer c, a monomer similar to the monomer c in the description of the above-mentioned resin (I) can be used. Furthermore, as the above-mentioned monomer d, a monomer similar to the monomer d in the description of the above-mentioned resin (I) can be used. For this reason, herein, description of the above-mentioned monomers c and d is omitted.

A method of introducing the polysiloxane component (polysiloxane structure) by graft polymerization is not particularly limited, but examples thereof include a method of introducing a polysiloxane graft copolymerization component using a silicone macromonomer, as described in Japanese Unexamined Patent Application, First Publication No. Hei 2-308806, Japanese Unexamined Patent Application, First Publication No. Hei 2-251555, and the like.

The content of the above-mentioned (a) modified acrylic-based resin having a polysiloxane component in the surface layer is not particularly limited, but from the viewpoint of improvement of releasability, the content is preferably 0.01 parts by mass or more, more preferably 1 part by mass or more, further preferably 10 parts by mass or more, and particularly preferably 25 parts by mass or more, based on 100 parts by mass of the resin component constituting the surface layer. Furthermore, from the viewpoint of suppressing transfer of the silicone component (suppression), the content of the above-mentioned (a) modified acrylic-based resin having a polysiloxane component in the surface layer is preferably 99 parts by mass or less, more preferably 70 parts by mass or less, further preferably 50 parts by mass or less, particularly preferably 40 parts by mass or less, and especially preferably 35 parts by mass or less, based on 100 parts by mass of the resin component constituting the surface layer.

<(b) Acrylic-Based Resin Having No Polysiloxane Component>

The resin component that is the main component of the surface layer may contain (b) an acrylic-based resin having no polysiloxane component, in addition to (a) the modified acrylic-based resin having a polysiloxane component.

Examples of the acrylic-based resin having no polysiloxane component include a polymer obtained by polymerizing at least the above-mentioned acrylic-based monomer b (that is, acrylic-based monomer b having a carbon-carbon unsaturated double bond in one molecule). As the above-mentioned acrylic-based monomer b, a monomer similar to the monomer b in the description of the above-mentioned resin (I) can be used. For this reason, herein, description of the acrylic-based monomer b is omitted.

It is preferable that the relevant acrylic-based resin having no polysiloxane component is a polymer obtained by polymerizing (C) the monomer c having a carbon-carbon unsaturated double bond and a crosslinking functional group in one molecule and/or (D) the monomer d having a carbon-carbon unsaturated double bond in one molecule together with the above-mentioned monomer b. As the above-mentioned monomer c, a monomer similar to the monomer c in the description of the above-mentioned resin (I) can be used. Furthermore, as the above-mentioned monomer d, a monomer similar to the monomer d in the description of the above-mentioned resin (I) can be used. For this reason, herein, description of the above-mentioned monomers c and d is omitted.

The resin component in the surface layer may be only the above-mentioned (a) modified acrylic-based resin having a polysiloxane component, or may contain (b) the acrylic-based resin having no polysiloxane component in addition to the above-mentioned (a) modified acrylic-based resin having a polysiloxane component. Herein, it is preferable that the resin component in the surface layer is the above-mentioned (a) modified acrylic-based resin and (b) the acrylic-based resin having no polysiloxane component. When the resin component in the surface layer contains the above-mentioned (b) acrylic-based resin, the content of the above-mentioned (b) acrylic-based resin is not limited, but from the viewpoint of suppressing transfer of the silicone component (suppression), the content is preferably 1 part by mass or more, more preferably 30 parts by mass or more, further preferably 50 parts by mass or more, particularly preferably 60 parts by mass or more, and especially preferably 65 parts by mass or more, based on 100 parts by mass of the resin component in the surface layer. Furthermore, when the resin component in the surface layer contains the above-mentioned (b) acrylic-based resin, from the viewpoint of improvement of releasability, the content of the above-mentioned (b) acrylic-based resin is preferably 99.99 parts by mass or less, more preferably 99 parts by mass or less, further preferably 90 parts by mass or less, and particularly preferably 75 parts by mass or less, based on 100 parts by mass of the resin component in the surface layer.

When the resin component in the surface layer contains the above-mentioned (a) modified acrylic-based resin and the above-mentioned (b) acrylic-based resin, a ratio of these resins is preferably the above-mentioned (a): the above-mentioned (b)=0.01:99.99 to 99:1 (mass ratio), more preferably the above-mentioned (a):the above-mentioned (b)=1:99 to 70:30 (mass ratio), further preferably the above-mentioned (a):the above-mentioned (b)=10:90 to 50:50 (mass ratio), particularly preferably the above-mentioned (a):the above-mentioned (b)=25:75 to 40:60 (mass ratio), and especially preferably the above-mentioned (a):the above-mentioned (b)=25:75 to 35:65 (mass ratio).

The resin component in the surface layer may contain another resin component in addition to the above-mentioned (a) modified acrylic-based resin having a polysiloxane component and (b) the acrylic-based resin having no polysiloxane component. The content of the other resin component is preferably 10 parts by mass or less, more preferably 5 parts by mass or less, and further preferably 1 part by mass or less, based on 100 parts by mass of the resin component in the surface layer. It is preferable that the resin component in the surface layer is only the acrylic-based resin, and it is more preferable that the resin component of the surface layer is in particular the above-mentioned (a) modified acrylic-based resin having a polysiloxane component and (b) the acrylic-based resin having no polysiloxane component. It is preferable that the surface layer does not contain (i) an alkanol-modified amino resin, (ii) an alkyd resin (the relevant alkyd resin includes a modified alkyd resin) or (iii) an acrylic urethane resin having a long chain alkyl group with 10 or more and 30 or less carbon atoms.

Out of organic groups bound to the silicon atom in one molecule, the silicon atom existing in the resin component in the surface layer, a phenyl group is present preferably 12 mol % or less, more preferably 10 mol % or less, and further preferably 5 mol % or less. It is particularly preferable that a phenyl group is not contained.

<(c) Crosslinking Agent>

The surface layer may contain (c) a crosslinking agent together with the resin component that is a main component. The relevant crosslinking agent has the function of crosslinking the above-mentioned (a) modified acrylic-based resins (when the resin component contains the above-mentioned (b) acrylic-based resin, the following (1) to (3):
(1) the above-mentioned (a) modified acrylic-based resins,
(2) the above-mentioned (b) acrylic-based resins, and/or
(3) the above-mentioned (a) modified acrylic-based resin and the above-mentioned (b) acrylic-based resin).

The above-mentioned crosslinking agent (c) is not limited, but examples thereof include isocyanate, diisocyanate, multivalent isocyanate, an amino resin, diamine, polyamine, dialdehyde, an epoxy resin, a bisepoxy resin, and the like. The crosslinking agent (c) can be used alone or in combination of two or more kinds thereof.

When the (c) crosslinking agent is contained in the surface layer, from the viewpoint of the function that transfer of the silicone component to a subject to which the release film is attached is suppressed by sufficiently performing the above-mentioned crosslinking, the content of the (c) crosslinking agent is preferably 5 parts by mass or more, more preferably 10 parts by mass or more, further preferably 15 parts by mass or more, particularly preferably 25 parts by mass or more, especially preferably 30 parts by mass or more, and most preferably 35 parts by mass or more, based on 100 part by mass of the resin component constituting the surface layer. Furthermore, when the (c) crosslinking agent is contained in the surface layer, from the viewpoint of processability when the surface layer is formed, the content of the (c) crosslinking agent in the surface layer is preferably 70 parts by mass or less, more preferably 65 parts by mass or less, further preferably 60 parts by mass or less, particularly preferably 55 parts by mass or less, especially preferably 50 parts by mass or less, and most preferably 45 parts by mass or less, based on 100 parts by mass of the resin component constituting the surface layer. Particularly, the content of the (c) crosslinking agent in the surface layer is preferably 5 parts by mass or more, more preferably 10 parts by mass or more, further preferably 15 parts by mass or more, particularly preferably 25 parts by mass or more, especially preferably 30 parts by mass or more, and most preferably 35 parts by mass or more, based on the total amount 100 parts by mass of the above-mentioned (a) modified acrylic-based resin and the above-mentioned (b) acrylic-based resin. Furthermore, particularly, the content of the (c) crosslinking agent in the surface layer is preferably 70 parts by mass or less, more preferably 65 parts by mass or less, further preferably 60 parts by mass or less, particularly preferably 55 parts by mass or less, especially preferably 50 parts by mass or less, and most preferably 45 parts by mass or less, based on the total amount 100 parts by mass of the above-mentioned (a) modified acrylic-based resin and the above-mentioned (b) acrylic-based resin.

<Other Components>

[Additive]

The surface layer and the substrate layer may each contain at least one kind of an additive, if necessary. Examples of the additive include stabilizers such as an antioxidant, a chlorine absorbing agent, and an ultraviolet absorbing agent, a lubricant, a plasticizer, a flame retardant, an antistatic agent, a coloring agent, a delustering agent, and the like. Such an additive may be added to the substrate layer or the surface layer in such a range that the effect of the present invention is not deteriorated. At least one kind of the additive may be contained only in any of the substrate layer or the surface layer, or may be contained in all the layers of the substrate layer and the surface layer. Furthermore, the substrate layer and the surface layer may each contain additives that are the same or different from each other.

The "antioxidant" has at least a role as a primary agent that is blended for the purpose of suppressing deterioration due to heat and/or oxidation during manufacturing of the release film, and a role as a secondary agent that is blended for the purpose of suppressing deterioration with time when used for a long period of time. Depending on these roles, different kinds of the antioxidants may be used, or one kind of the antioxidant that plays two roles may be used.

When different kinds of the antioxidants are used, for example, it is preferable that as the primary agent for the purpose of preventing deterioration during manufacturing such as deterioration in a molding machine, for example, 2,6-di-tert-butyl-p-cresol (general name: BHT) is added to compositions for obtaining each layer in an amount of about 1,000 to 3,000 ppm. Almost all of the antioxidant that is blended for this purpose is consumed at a molding step, and the antioxidant hardly remains in the release film. For this reason, generally, the residual amount becomes smaller than 100 ppm, and this is preferable in that there is almost no contamination of the adherend due to the antioxidant.

As the secondary agent, it is possible to use a known antioxidant. Examples of such an antioxidant include phenol-based, hindered amine-based, phosphite-based, lactone-based, and tocopherol-based heat stabilizers and antioxidants. Specifically, examples of such an antioxidant include dibutylhydroxytoluene, pentaerythritol tetrakis[3-(3,5-di-t-butyl-4-hydroxyphenyl)propionate], 1,3,5-trimethyl-2,4,6-tris(3,5-di-t-butyl-4-hydroxy)benzene, and tris(2,4-di-t-butylphenyl) phosphite, and the like. More specifically, examples of such an antioxidant include Irganox (registered trademark) 1010, Irganox (registered trademark) 1330, and Irgafos (registered trademark) 168 that are antioxidants manufactured by BASF.

Inter alia, at least one kind selected from the phenol-based antioxidant system or a combination thereof, a combination of the phenol-based antioxidant and the phosphite-based antioxidant, a combination of the phenol-based antioxidant and the lactone-based antioxidant, and a combination of the phenol-based antioxidant, the phosphite-based antioxidant, and the lactone-based antioxidant can give the effect of suppressing deterioration with time when the film is used for a long period of time, and thus they are preferable.

Furthermore, as the secondary agent, a phosphorus-based antioxidant may be used. Examples of such a phosphorus-based antioxidant include tris(2,4-di-t-butylphenyl) phosphite (product name: Irgafos (registered trademark) 168) and bis(2,4-di-t-butyl-6-methylphenyl)ethyl phosphite (product name: Irgafos (registered trademark) 38), and the like.

The content of the above-mentioned antioxidant as the secondary agent is preferably 300 ppm or more and 2,500 ppm or less, and more preferably 500 ppm or more and 1,500 ppm or less, based on the total amount of resins contained in each layer. When the content is set to 300 ppm or more, it is easy to give the effect of suppressing deterioration with time when the film is used for a long period of time, and when the content is set to 2,500 ppm or less, it is easy to prevent contamination of the adherend due to the antioxidant.

The "chlorine absorbing agent" is not particularly limited, but examples thereof include metal soap such as calcium stearate.

The "ultraviolet absorbing agent" is not particularly limited, but examples thereof include benzotriazole (Tinuvin 328 manufactured by BASF, and the like), benzophenone (Cysorb UV-531 manufactured by Cytec, and the like), and hydroxybenzoate (UV-CHEK-AM-340 manufactured by Ferro, and the like), and the like.

The "lubricant" is not particularly limited, but examples thereof include primary amide (stearic acid amide and the like), secondary amide (N-stearylstearic acid amide and the like), and ethylenebisamide (N, N'-ethylenebisstearic acid amide and the like), and the like.

The "plasticizer" is not particularly limited, but examples thereof include a PP random copolymer and the like.

The "flame retardant" is not particularly limited, but examples thereof include a halogen compound, aluminum hydroxide, magnesium hydroxide, a phosphoric acid salt, borate, an antimony oxide, and the like.

The "antistatic agent" is not particularly limited, but examples thereof include glycerin monoester (glycerin monostearate and the like), ethoxylated secondary amine, and the like.

The "coloring agent" is not particularly limited, but examples thereof include a cadmium- or chromium-containing inorganic compound, an azo or quinacridone organic pigment, and the like.

The "delustering agent" is added for delustering (matting), and is not particularly limited. Examples of the delustering agent include inorganic particles such as silica particles, alumina, (synthetic) zeolite, calcium carbonate, kaolin, talc, mica, zinc oxide, magnesium oxide, quartz, magnesium carbonate, barium sulfate, and titanium dioxide; and organic particles such as polystyrene, polyacrylic-based particles, polymethyl methacrylate (PMMA)-based particles, crosslinked polyethylene particles, polyester, polyamide, polycarbonate, polyether, polyether sulfone, polyether imide, polyphenylene sulfide, polyether ether ketone, polyamideimide, a (crosslinked) melamine resin, a benzoguanamine resin, a urea resin, an amino resin, a furan resin, an epoxy resin, a phenol resin, an unsaturated polyester resin, a vinylester resin, a diallyl phthalate resin, a polyimide resin, fatty acid amide, and a fatty acid glycerin ester compound, and the like. It is preferable that the delustering agent is a particle having a particle diameter of 0.1 µm to 10 µm, and PMMA and silica particles are more preferable because they are excellent in giving delustering properties and slidability. For example, when the above-mentioned substrate layer contains such a pigment, the slidability of front and rear surfaces of the substrate layer is improved, and delustering can be exerted.

<Relationship Between $M_T$ and $M_B$>

When a ratio of the content of silicon to the content of all elements existing on the outermost surface of the above-mentioned surface layer is set to $M_T$ (atomic %), and a ratio of the content of silicon to the content of all elements existing at a position in a depth of 10 nm from the outermost surface of the above-mentioned surface layer vertically toward the substrate layer is set to $M_B$ (atomic %), the relationship between the $M_T$ and the $M_B$ is $5 \leq M_T/M_B \leq 30$ (that is, $M_T/M_B$ is 5 or more and 30 or less), or $M_B=0$. When the $M_T/M_B$ is less than 5 ($5 > M_T/M_B$), the silicone component is not segregated on the front surface of the surface layer, and a large amount of the silicone component exists on a substrate layer side of the surface layer (opposite side to the front surface of the surface layer; also referred to as a rear surface side), so that excellent silicone transferability may not be obtained. From the viewpoint that the film is hardly scratched and has excellent silicone transferability and releasability, the $M_T/M_B$ is 30 or less. The $M_T/M_B$ means $M_T \div M_B$.

In the present invention, the relationship between the $M_T$ and the $M_B$ is preferably $6 \leq M_T/M_B$, more preferably $8 \leq M_T/M_B$, further preferably $10 \leq M_T/M_B$, and particularly preferably $13 \leq M_T/M_B$. In the present invention, the relationship between the $M_T$ and the $M_B$ is preferably $M_T/M_B \leq 25$, more preferably $M_T/M_B \leq 24$, further preferably $M_T/M_B \leq 23$, and particularly preferably $M_T/M_B \leq 20$. Furthermore, the case where $M_B=0$ is also a preferable aspect. Each preferable aspect in the above-mentioned relationship between $M_T$ and $M_B$ is found from the viewpoint of both transferability of the silicone component and good releasability.

Herein, the technical significance of the $M_T/M_B$ will be described. The $M_T/M_B$ shows an extent (degree) of segregation of the silicone component on the outermost surface. A large $M_T/M_B$ value shows that the silicone component is segregated on the outermost surface, while components other than the silicone component (for example, an acrylic component in (a) the modified acrylic-based resin having a polysiloxane component, and when (b) the acrylic-based resin having no polysiloxane component is contained in the surface layer, the relevant (b) acrylic-based resin itself in addition to the above-mentioned acrylic component) are segregated on the substrate layer side. Herein, in the case of $5 \leq M_T/M_B \leq 30$ or $M_B=0$ in the surface layer, the following (1) and (2) states are attained. That is, it is considered that (1) the silicone component is segregated on the outermost surface of the surface layer, and a similar surface state to that of the silicone-based release film is attained, and (2) the acrylic component in the above-mentioned (a) modified acrylic-based resin having a polysiloxane component and the above-mentioned (b) acrylic-based resin itself are segregated on the substrate layer side, so that the relevant component (and the relevant acrylic-based resin) are interacted with the substrate layer and other layers adjacent to the relevant substrate layer. Due to such a mechanism, the release film of the present embodiment has both the effect of good releasability and the effect of suppressing transfer of the silicone component to a subject to which the surface layer is attached.

In the present invention and the present specification, values of the $M_T$ and $M_B$ are each measured by procedures described in Examples, and a value of the $M_T/M_B$ is calculated from the above-mentioned measured values.

The $M_T$ in the present embodiment satisfies $8.5 \leq M_T \leq 30$ (that is, the $M_T$ is 8.5 or more and 30 or less). For this reason, the release film of the present embodiment exerts good releasability. When the $M_T$ is less than 8.5 ($8.5 > M_T$), good releasability may not be obtained. $M_T$ is 30 or less from the viewpoint of good silicone transferability. The $M_T$ in the present embodiment is preferably $9 \leq M_T$, more preferably $10 \leq M_T$, further preferably $11 \leq M_T$, and particularly preferably $12 \leq M_T$. Furthermore, the $M_T$ in the present embodiment is preferably $M_T \leq 28$, more preferably $M_T \leq 24$, further preferably $M_T \leq 20$, still further preferably $M_T \leq 16$, and particularly preferably $M_T \leq 14$.

The ratio $M_T$ (atomic %) of the content of silicon to the content of all elements existing on the outermost surface of the surface layer of the release film is a value measured under measurement mode: monochrometer, X-ray source: Al, measurement area: 500 µmφ, and measurement element: silicon (Si), using, as a measuring instrument, an X-ray photoelectron spectroscopy (XPS) measuring instrument ESCA LAB250 (manufactured by Thermo VG Scientific).

The ratio $M_B$ (atomic %) of the content of silicon to the content of all elements existing at a position in a depth of 10 nm from the outermost surface of the surface layer of the release film vertically toward the substrate layer is a value measured by performing XPS analysis while digging the surface layer from the outermost surface side by Ar ion sputtering. The conditions for sputtering were irradiation ion: argon (Ar), current value: 2.5 (µA), voltage: 120 (V), sputter rate: 0.125 (nm/sec). Furthermore, the measurement conditions for $M_B$ (measuring instrument, measurement mode, X-ray source, measurement area, measurement element, and the like) are similar to the above-mentioned measurement conditions for $M_T$.

Examples of a means for adjusting the values of the $M_T$ and $M_T/M_B$ include a kind and content of the polysiloxane component in (a) the modified acrylic-based resin having a polysiloxane component; the content of (a) the modified acrylic-based resin having a polysiloxane component; a kind and content of (b) the acrylic-based resin component having no polysiloxane component; a kind and content of the (c) crosslinking agent; a kind of solvent, a drying temperature and a drying time after coating, and a coating amount (or film thickness) when a coating liquid described later is used upon formation of the surface layer; and the like. For example, when the content of the above-mentioned (a) modified acrylic-based resin having a polysiloxane component is increased, the above-mentioned $M_T$ and $M_T/M_B$ each tend to be large, and when the content of the above-mentioned (a) modified acrylic-based resin having a polysiloxane component is decreased, the above-mentioned $M_T$ and $M_T/M_B$ each tend to be small. In the state where the above-mentioned $M_T$ is large, however, the above-mentioned $M_T/M_B$ may not have a tendency as described above. When the coating amount (or film thickness) is increased, the $M_T$ tends to be large, and when the coating amount is reduced, the $M_T$ tends to be small.

From the viewpoint of easily enhancing releasability, the thickness of the surface layer is preferably 0.01 µm or more, more preferably 0.1 μm or more, and particularly preferably 0.3 μm or more. From the viewpoint of hardly transferring the silicone component, the thickness of the surface layer is preferably 10 μm or less, more preferably 5 μm or less, further preferably 3 μm or less, and particularly preferably 1 μm or less. The thickness of the surface layer is measured by optical interferometry using a surface/layer cross-sectional shape measuring instrument (for example, "VertScan (registered trademark) 2.0" manufactured by Ryoka Systems Inc.).

[Method of Producing Surface Layer]

As a suitable aspect, the surface layer is formed by the following manner: a coating liquid containing the above-mentioned (a) modified acrylic-based resin having a polysiloxane component (and if necessary, the (b) acrylic-based resin having no polysiloxane component), as well as if necessary, the (c) crosslinking agent and/or other components and the like, and at least one kind of a solvent is coated on or above the substrate layer to obtain a coating layer, and then the solvent is removed from the coating layer.

The above-mentioned solvent is not particularly limited as long as components other than the solvent in the above-mentioned coating liquid can be dissolved and/or uniformly dispersed. Examples of the above-mentioned solvent include ketone/ester-based organic solvents such as methyl ethyl ketone (MEK) and ethyl acetate, and aliphatic hydrocarbon-based organic solvents such as n-heptane and methylcyclohexane. From the viewpoint of handleability of the coating liquid and easily enhancing the manufacturing efficiency of the release film, the boiling point of the solvent is preferably 10 to 150° C., and more preferably 20 to 120° C. The solvent can be used alone or in combination of two or more kinds thereof.

The concentration of the components other than the solvent in the coating liquid (so-called concentration of solid components that remain on the surface layer after removal of the solvent, for example, the concentration of the above-mentioned (a) modified acrylic-based resin having a polysiloxane component and, if necessary, the (b) acrylic-based resin having no polysiloxane component, as well as if necessary, the (c) crosslinking agent and other components) is not limited, but from the viewpoint of the stability and coating suitability of the coating liquid, the concentration is preferably 1 to 24% by mass, more preferably 1 to 19% by mass, and further preferably 1 to 14% by mass with respect to the total amount of the coating liquid. The coating method is not particularly limited, and examples thereof include methods using a blade coater, an air knife coater, a roll coater, a bar coater, a gravure coater, a microgravure coater, a rod blade coater, a lip coater, a die coater, a curtain coater, a printing machine, and the like.

The method of removing the solvent from the coating layer is not particularly limited as long as the solvent can be vaporized. It is to be noted that removal of the solvent does not only mean complete removal of the solvent, but also includes removal of the solvent to such an extent that a layer is formed. Examples of the method of removing the solvent include a method of drying the coating layer under heat. From the viewpoint of easily achieving both solvent removal and promotion of a crosslinking reaction, it is preferable to dry the coating layer at 70 to 170° C., and it is more preferable to dry the coating layer at 90 to 150° C.

[Roughening of Release Film Surface]

Fine surface roughness that improves winding suitability may be given to the surface of the release film of the present embodiment in such a range that there is no problem in attachment when the release film of the present embodiment is used, and the like. As a method of giving fine irregularities to the film surface, an embossing method, an etching method, known various roughening methods, and the like can be adopted.

[T Letter Peel Release Force]

A T letter peel release force to a polyester pressure-sensitive adhesive tape attached to the film surface on the surface layer side of the release film of the present embodiment is measured as a T letter peel release force when a measurement sample is heat-treated at 130° C. for 90 seconds, and thereafter, is allowed to stand for 20 hours under environment of a temperature of 70° C. and a humidity of 50%, as described in later Examples. The above-mentioned T letter peel release force of the release film is measured by the following method.

A polyester pressure-sensitive adhesive tape with 50 mm in width×200 mm in length (NO. 31B Tape manufactured by NITTO DENKO CORPORATION, acrylic-based pressure-sensitive adhesive agent) is attached to the film surface on the surface layer side of the release film by reciprocating a 2 kg roller two times. The resulting film is heat-treated at 130° C. for 90 seconds, and thereafter, allowed to stand for 20 hours under environment of a temperature of 70° C. and a humidity of 50%. A sample that is cut out from the resulting film into a width of 25 mm is used as a measurement sample, T letter peel release is performed at a speed of 1,000 mm/min using a tensile testing machine (for example, universal tensile testing machine Technograph TGI-1kN manufactured by Minebea), and a release force at that time is measured. The thus measured value is defined as the T letter peel release force.

From the viewpoint of easily enhancing adhesion of the release film to the adherend, the T letter peel release force is preferably 0.005 N/25 mm or more, more preferably 0.01 N/25 mm or more, and further preferably 0.02 N/25 mm or more. From the viewpoint of easily enhancing releasability, the above-mentioned T letter peel release force is preferably 1.2 N/25 mm or less, more preferably 0.9 N/25 mm or less, further preferably 0.6 N/25 mm or less, still further preferably 0.5 N/25 mm or less, particularly preferably 0.3 N/25 mm or less, and especially preferably 0.2 N/25 mm or less.

[Thickness of Release Film]

From the viewpoint of handleability as the release film, the thickness of the release film of the present embodiment is preferably 18 μm or more, and more preferably 20 μm or more. From the viewpoint of handleability as the release film, the thickness of the release film is preferably 100 μm or less, and more preferably 50 μm or less. The thickness of the release film of the present embodiment is measured using a micrometer (JIS B-7502) in accordance with JIS C-2151.

[Stretching of Release Film]

The release film of the present embodiment may be stretched, or may not be stretched. From the viewpoint of easily obtaining good releasability such that the release force is light, it is preferable that at least the surface layer is non-stretched (not stretched).

Since the release film of the present embodiment has good releasability as well as low transferability of the silicone component, it is excellent as a film for release. The release film of the present embodiment can be widely used in medical field and industrial field. Examples of the application include separator film application and carrier film application.

Examples of the separator film include a laminate in which at least a pressure-sensitive adhesive layer (for example, (i) a sheet-shaped pressure-sensitive adhesive agent, (ii) a layer or a film having pressure-sensitive adhesiveness, (iii) a pressure-sensitive adhesive tape, and the like) is attached to the release film of the present embodiment. The separator film as the laminate is released at the interface between the surface layer of the release film of the present embodiment and the above-mentioned pressure-sensitive adhesive layer, and then at least the above-mentioned pressure-sensitive adhesive layer (or a sheet having a pressure-sensitive adhesive layer) is attached to various equipment (electrical equipment, electronic equipment, wearable equipment, medical equipment, and the like), various electric parts (semiconductor, hard disk, motor, connector, switch, and the like), and the like. Furthermore, examples of another separator film include a laminate in which (i') a poultice, (ii') an adhesive plaster, or the like having the above-mentioned pressure-sensitive adhesive layer is attached to the release film of the present embodiment. The separator film as the laminates is released at the interface between the surface layer of the release film of the present embodiment and the above-mentioned pressure-sensitive adhesive layer, and then, (i') or (ii') having the above-mentioned pressure-sensitive adhesive layer is attached to the human body as a medical article. Besides, the release film of the present embodiment is also used as a step (dicing, die bonding, back grind) tape used during manufacturing of a semiconductor product, a separator film attached to a dry film resist, a film for protection, or a separator film attached to a building material.

Examples of the carrier film include a laminate in which the pressure-sensitive adhesive layer or the like is attached to the release film of the present embodiment. When the relevant laminate is used as a correction tape for example, a transfer layer including a pressure-sensitive adhesive layer is transferred to a correction site of a letter or the like, and the release film of the present embodiment is recovered. Furthermore, examples of another carrier film include a laminate in which a green sheet or the like is attached to the release film of the present embodiment. When the relevant laminate is used during manufacturing of, for example, a green sheet for a laminated ceramic capacitor, the green sheet is used as a material for manufacturing a laminated ceramic capacitor, and the release film of the present embodiment is recovered and is re-used, if necessary.

EXAMPLES

The present invention will be further specifically described below by way of Examples and Comparative Examples, but the present invention is not limited to these Examples. It is to be noted that unless otherwise indicated, "part(s)" and "%" indicate "part(s) by mass" and "% by mass", respectively.

[Measuring Method and Evaluation Method]
Various measuring methods and evaluation methods in Examples and Comparative Examples are as follows.
[Thickness of Surface Layer]
Measuring machine: Optical interferometric surface/layer cross-sectional shape measuring instrument VertScan (registered trademark) 2.0 manufactured by Ryoka Systems Inc.

In a layer thickness measurement mode of the measuring machine (bearing measurement), an optical distance of each layer was obtained from the refractive index of a substrate layer (polyethylene terephthalate substrate layer=1.60) and the refractive index 1.48 of a surface layer, and the thickness of the surface layer was measured.

[Thicknesses of Substrate Layer and Film]
The thickness of a release film and the thickness of the substrate layer were measured using a micrometer (JIS B-7502) in accordance with JIS C-2151.
[X-Ray Photoelectron Spectroscopy (XPS) Analysis]
A ratio $M_T$ (atomic %) of the content of silicon to the content of all elements existing on the outermost surface of the surface layer of the release film was measured under the following conditions.
Measuring instrument: X-ray photoelectron spectroscopy (XPS) measuring instrument ESCA LAB250 (manufactured by Thermo VG Scientific)
Measurement mode: monochrometer, X-ray source: Al, measurement area: 500 µmφ,
Measurement element: Silicon (Si)
[XPS Depth Direction Analysis]
XPS analysis was performed while digging the surface layer from the outermost surface side by Ar ion sputtering, and a ratio $M_B$ (atomic %) of the content of silicon to the content of all elements existing at a position in a depth of 10 nm from the outermost surface in the surface layer vertically toward the substrate layer was measured. The measuring conditions for XPS are similar to the above-mentioned measuring conditions for the $M_T$. Sputtering was performed under the following conditions.
Irradiation ion: argon (Ar), current value: 2.5 (µA), voltage: 120 (V), sputtering rate: 0.125 (nm/sec)
[Silicone Transferability Test]
A test for evaluating the transferability of silicone from the surface layer of the release film was performed. Specifically, the following (1) to (5) were performed.
(1) A polypropylene (PP) film with 50 mm in width×100 mm in length "ALPHAN (registered trademark) E-201F" (manufactured by Oji F-Tex Co., Ltd. thickness: 50 µm) was overlaid on the film surface of the surface layer side of the release film.
(2) The relevant release film and the PP film were held by the press stand of a hot press machine "mini test press-10" (manufactured by Toyo Seiki Seisaku-sho, Ltd.), and heated and pressurized for 30 minutes under conditions of 110° C. and 15 kN/mm² to obtain a press-treated product.
(3) Then, the PP film was peeled from the relevant press-treated product. Then, the XRF measurement was performed on the peeled PP film. Specifically, a surface that was one surface of the PP film and was in contact with the surface layer of the release film was used as a measurement surface, and the XRF measurement was performed under the following conditions.
Measuring machine: X-RAY SPECTROMETER "ZSX mini" (manufactured by Rigaku Corporation)
Thermally uniformizing temperature: 35.6, pressure: 2.8 Pa
X-ray output: 40 kV 1.20 mA
Measurement element: silicon (Si)
(4) Then, an untreated PP film (ALPHAN (registered trademark) E-201F, manufactured by Oji F-Tex Co., Ltd. thickness 50 µm) was prepared separately. Then, the XRF measurement was performed on the untreated PP film as in the above-mentioned (3).
(5) Finally, a difference between an XRF measured value of the PP film obtained by peeling from the above-mentioned press-treated product and an XRF measured value of the untreated PP film was calculated as a silicone transfer amount.
[T Letter Peel Release Force]
A polyester pressure-sensitive adhesive tape with 50 mm in width×200 mm in length (NO. 31B Tape manufactured by NITTO DENKO CORPORATION, acrylic-based pressure-sensitive adhesive agent) was attached to the film surface on the surface layer side of the release film by reciprocating a 2 kg roller two times, to obtain a pre-treatment attached product.

Then, heat treatment at 130° C. for 90 seconds was performed on the relevant attached product. It is to be noted that in the relevant heat treatment, a hot air drying machine was used. Herein, the heat treatment at 130° C. for 90 seconds means that the relevant attached product was placed in the hot air drying machine set at 130° C.

Then, a weight was placed on the heat-treated attached product such that a load was 5 KPa, and this was allowed to stand for 20 hours under environment of a temperature of 70° C. and a humidity of 50%.

Then, the attached product obtained by the above-mentioned standing was cut out into a width of 25 mm to obtain a measurement sample, a T letter peel release test was performed at a speed of 1,000 mm/min using a release testing machine (universal tensile testing machine Technograph TGI-1kN manufactured by Minebea), and a release force at that time was measured. Measurements were each performed three times, and an average value thereof was defined as a T letter peel release force of the release film.

Solutions A to C used in the following examples are as follows.
A: DYPC 300 (resin solution obtained by dissolving in a ketone/ester-based solvent a resin containing (a) a modified acrylic polymer having a polysiloxane component and (b) an acrylic polymer having no polysiloxane component; solid content concentration 33 wt %)
B: YL455 (resin solution obtained by dissolving (b) a resin containing an acrylic polymer having no polysiloxane component in a ketone/ester-based solvent; solid content concentration 28 wt %)
C: SUR200 (solution obtained by dissolving (c) an isocyanate-based crosslinking agent in ethyl acetate; solid content concentration 75 wt %)
D: Mixed solution of the above-mentioned solutions A to C
E: DYPC S110 (resin solution obtained by dissolving in a ketone/ester-based solvent a resin containing (a) a modified acrylic polymer having a polysiloxane component and (b) an acrylic polymer having no polysiloxane component; solid content concentration 28 wt %)
F: Mixed solution of the above-mentioned solution B, the above-mentioned solution C, and the above-mentioned solution E
G: Modified acrylic polymer having a polysiloxane component (a) with a weight average molecular weight of about 41,000 (solid content concentration 33 wt %), which was obtained by charging a solution obtained by mixing 100 g of Silaplane (registered trademark) FM-0711 (reactive polysiloxane) manufactured by JNC Co., Ltd., 75 g of 2-hydroxyethyl methacrylate, 25 g of methyl methacrylate, and 400 g of methyl ethyl ketone (MEK) into a flask equipped with a condenser tube, a thermometer, and a stirring device, raising the temperature to 80° C. while stirring under a nitrogen stream, and adding 4 g of azobisisobutyronitrile (AIBN) to perform a polymerization reaction for 2 hours.

Example 1

A resin component-containing solution A "DYPC S300" (manufactured by TOYO INK CO., LTD., total solid content concentration of resin components (a) and (b) 33 wt %) obtained by dissolving (a) a modified acrylic polymer having a polysiloxane component and (b) an acrylic polymer having no polysiloxane component in a ketone/ester-based solvent was prepared. Further, a resin component-containing solution B "YL455" (manufactured by TOYO INK CO., LTD., solid content concentration of resin component 28 wt %) obtained by dissolving (b) an acrylic polymer having no polysiloxane component in a ketone/ester-based solvent was prepared. Furthermore, a solution C "SUR200" (manufactured by TOYO INK CO., LTD. 75 wt %) obtained by dissolving (c) an isocyanate-based crosslinking agent in ethyl acetate was prepared. Then, the above-mentioned solution A, the above-mentioned solution B, and the above-mentioned solution C were mixed to prepare a mixed solution D. The mixing ratio of the above-mentioned solution A, the above-mentioned solution B, and the above-mentioned solution C upon the above-mentioned mixing was solution A:solution B:solution C=10:90:15 (mass ratio). Then, the mixed solution D was diluted so that the total concentration of the above-mentioned polymer (a), the above-mentioned polymer (b), and the isocyanate crosslinking agent (c) in the above-mentioned solution D became 12% by mass. A solvent of heptane:methyl ethyl ketone (MEK)=2:8 (mass ratio) was used upon the dilution. Thereby, a coating liquid X for forming a surface layer was obtained.

Then, as a substrate layer, a biaxially-stretched polyethylene terephthalate film having a thickness of 38 μm ("TOYOBO ESTER (registered trademark) film E5100" manufactured by TOYOBO CO., LTD.) was prepared. Then, using a Meyer bar (manufactured by YASUDA SEIKI SEISAKUSHO, LTD., shaft diameter: 6.35 mmφ, ROD No. 4), the coating liquid X was coated on the relevant substrate layer, dried with an explosion-proof type drying machine at 150° C. for 90 seconds, and then cured in a thermostatic chamber at 50° C. for 3 days. Thereby, a release film of Example 1 having the substrate layer and the surface layer (thickness of surface layer: 0.6 μm) was obtained.

Example 2

A resin component-containing solution E "DYPC S110" (manufactured by TOYO INK CO., LTD., total solid content concentration of resin components (a) and (b) 28 wt %) obtained by dissolving (a) a modified acrylic polymer having a polysiloxane component and (b) an acrylic polymer having no polysiloxane component in a ketone/ester-based solvent was prepared. Further, a resin component-containing solution B "YL455" (manufactured by TOYO INK CO., LTD., solid content concentration of resin component 28 wt %) obtained by dissolving (b) an acrylic polymer having no polysiloxane component in a ketone/ester-based solvent was prepared. Furthermore, a solution C "SUR200" (manufactured by TOYO INK CO., LTD. 75 wt %) obtained by dissolving (c) an isocyanate-based crosslinking agent in ethyl acetate was prepared. Then, the above-mentioned solution E, the above-mentioned solution B, and the above-mentioned solution C were mixed to prepare a mixed solution F. The mixing ratio of the above-mentioned solution E, the above-mentioned solution B, and the above-mentioned solution C upon the above-mentioned mixing was solution E:solution B:solution C=80:20:15 (mass ratio). Then, the mixed solution F was diluted so that the total concentration of the above-mentioned polymer (a), the above-mentioned polymer (b), and the isocyanate crosslinking agent (c) in the above-mentioned solution F became 12% by mass. A solvent of heptane:MEK=2:8 (mass ratio) was used upon the dilution. Thereby, a coating liquid Y for forming a surface layer was obtained.

Then, as a substrate layer, a biaxially-stretched polyethylene terephthalate film having a thickness of 38 μm ("TOYOBO ESTER (registered trademark) film E5100" manufactured by TOYOBO CO., LTD.) was prepared. Then, using a Meyer bar (manufactured by YASUDA SEIKI SEISAKUSHO, LTD., shaft diameter: 6.35 mmφ, ROD No. 4), the coating liquid Y was coated on the relevant substrate layer, dried with an explosion-proof type drying machine at 150° C. for 90 seconds, and then cured in a thermostatic chamber at 50° C. for 3 days. Thereby, a release film of Example 2 having the substrate layer and the surface layer (thickness of surface layer: 0.6 μm) was obtained.

Example 3

A release film of Example 3 was obtained in the same manner as in Example 2, except that the mixing ratio of the above-mentioned solution E, the above-mentioned solution B, and the above-mentioned solution C upon the above-mentioned mixing was 60:40:15 (mass ratio) in place of solution E:solution B:solution C=80:20:15 (mass ratio).

Example 4

A release film of Example 4 was obtained in the same manner as in Example 2, except that the mixing ratio of the above-mentioned solution E, the above-mentioned solution B, and the above-mentioned solution C upon the above-mentioned mixing was 50:50:15 (mass ratio) in place of solution E:solution B:solution C=80:20:15 (mass ratio).

Example 5

A release film of Example 5 was obtained in the same manner as in Example 2, except that the mixing ratio of the above-mentioned solution E, the above-mentioned solution B, and the above-mentioned solution C upon the above-mentioned mixing was 40:60:15 (mass ratio) in place of solution E:solution B:solution C=80:20:15 (mass ratio).

Example 6

A solution obtained by mixing 100 g of Silaplane (registered trademark) FM-0711 (reactive polysiloxane) manufactured by JNC Co., Ltd., 75 g of 2-hydroxyethyl methacrylate, 25 g of methyl methacrylate, and 400 g of methyl ethyl ketone (MEK) was charged into a flask equipped with a condenser tube, a thermometer, and a stirring device. Then, the temperature of the above-mentioned charged solution was raised to 80° C. while stirring under a nitrogen stream, and thereafter, 4 g of azobisisobutyronitrile (AIBN) was added to the above-mentioned solution to perform a polymerization reaction for 2 hours. Thereby, a resin containing (a) a modified acrylic polymer having a polysiloxane component as a main component with a weight average molecular weight of about 41,000 was obtained. A resin component-containing solution G containing the relevant resin (solid content concentration 33 wt %) was prepared. Further, a resin component-containing solution B "YL455" (manufactured by TOYO INK CO., LTD., solid content concentration of resin component 28 wt %) obtained by dissolving (b) an acrylic polymer having no polysiloxane component in a ketone/ester-based solvent was prepared. Furthermore, a solution C "SUR200" (manufactured by TOYO INK CO., LTD. 75 wt %) obtained by dissolving (c) an isocyanate-based crosslinking agent in ethyl acetate was prepared. Then, the above-mentioned solution G, the above-mentioned solution B, and the above-mentioned solution C were mixed to prepare a mixed solution H. The above-mentioned solution G, the above-mentioned solution B, and the above-mentioned solution C were mixed so that the mixing ratio of the above-mentioned solution G, the above-mentioned solution B, and the above-mentioned solution C upon the above-mentioned mixing became solid content parts by mass of solution G:solid content parts by mass of solution B:solid content parts by mass of solution C=30:70:40 (mass ratio). Then, the mixed solution H was diluted so that the total concentration of the above-mentioned polymer (a), the above-mentioned polymer (b), and the isocyanate crosslinking agent (c) in the above-mentioned solution H became 12% by mass. A solvent of heptane:MEK=2:8 (mass ratio) were used was used upon the dilution. Thereby, a coating liquid Z for forming a surface layer was obtained.

Then, as a substrate layer, a biaxially-stretched polyethylene terephthalate film having a thickness of 38 μm ("TOYOBO ESTER (registered trademark) film E5100" manufactured by TOYOBO CO., LTD.) was prepared. Then, using a Meyer bar (manufactured by YASUDA SEIKI SEISAKUSHO, LTD., shaft diameter: 6.35 mmφ, ROD No. 4), the coating liquid Z was coated on the relevant substrate layer, dried with an explosion-proof type drying machine at 150° C. for 90 seconds, and then cured in a thermostatic chamber at 50° C. for 3 days. Thereby, a release film of Example 6 having the substrate layer and the surface layer (thickness of surface layer: 0.6 μm) was obtained.

Comparative Example 1

A silicone-based release film 38RL-07 (7) (manufactured by Oji F-Tex Co., Ltd.) was prepared. The relevant film has a two-layer structure of a substrate layer and a surface layer, a resin component that is a main component of the surface layer is a silicone-based resin, and a resin component that is a main component of the substrate layer is polyethylene terephthalate.

Comparative Example 2

A silicone-based release film 38RL-07 (L) (manufactured by Oji F-Tex Co., Ltd.) was obtained. The relevant film has a two-layer structure of a substrate layer and a surface layer, a resin component that is a main component of the surface layer is a silicone-based resin, and a resin component that is a main component of the substrate layer is polyethylene terephthalate.

Comparative Example 3

A release film of Comparative Example 3 was obtained in the same manner as in Example 2, except that the mixing ratio of the above-mentioned solution E, the above-mentioned solution B, and the above-mentioned solution C upon the above-mentioned mixing was 30:70:15 (mass ratio) in place of solution E:solution B:solution C=80:20:15 (mass ratio).

Results of:
(i) thickness of each layer,
(ii) ratio $M_T$ of the content of silicon to the content of all elements existing on the outermost surface of the surface layer (herein, the $M_T$ is also simply referred to as the Si element ratio of the outermost surface, or the Si element ratio at depth of 0 nm),
(iii) $M_T/M_B$ (herein, the $M_B$ indicates the ratio of the content of silicon to the content of all elements existing at a position in a depth of 10 nm from the outermost surface of the surface layer vertically toward the substrate layer. The $M_B$ is also simply referred to as the Si element ratio in a depth of 10 nm),
(iv) T letter peel release force, and
(v) silicone transfer amount
of the release films obtained in Examples 1 to 6 and Comparative Examples 1 to 3 are shown in Table 1.

TABLE 1

| | Surface layer | | | | | | |
|---|---|---|---|---|---|---|---|
| | Thickness [μm] | $M_B$ (Si element ratio in depth of 10 nm) [atomic %] | $M_T$ (Si element ratio of outermost surface) [atomic %] | $M_T/M_B$ (Si amount gradient) [—] | Substrate layer Thickness [μm] | T letter peel release force [N/25 mm] | Silicone transfer amount [kcps] |
| Example 1 | 0.6 | 0.74 | 12.95 | 17.5 | 38 | 0.11 | <0.001 |
| Example 2 | 0.6 | 1.63 | 13.60 | 8.3 | 38 | 0.12 | <0.001 |
| Example 3 | 0.6 | 0.82 | 11.78 | 14.4 | 38 | 0.23 | <0.001 |
| Example 4 | 0.6 | 0.47 | 10.88 | 23.1 | 38 | 0.39 | <0.001 |
| Example 5 | 0.6 | 0.55 | 9.06 | 16.5 | 38 | 0.77 | <0.001 |
| Example 6 | 0.6 | 0.85 | 12.10 | 14.2 | 38 | 0.24 | <0.001 |
| Comparative Example 1 | 0.1 | 31.68 | 28.75 | 0.9 | 38 | 0.25 | 0.037 |
| Comparative Example 2 | 0.1 | 33.44 | 28.20 | 0.8 | 38 | 0.11 | 0.039 |
| Comparative Example 3 | 0.6 | 0.66 | 8.34 | 12.6 | 38 | 1.28 | <0.001 |

The Si amount gradient ($M_T/M_B$) in the surface layer of the release film of Example 1 of the present embodiment showed a high value (17.5) exceeding 1. This high value shows segregation of a Si component on the outermost surface. The Si amount gradient ($M_T/M_B$) in the surface layer of the release films of Examples 2 to 6 showed a high value similar to that of Example 1. In all of Examples 1 to 6 of the present embodiment, the $M_T$ satisfies $8.5 \leq M_T \leq 30$.

As shown in the above-mentioned Table 1, it was observed that the release film of the present embodiment had good releasability such that a release force was light, like the silicone-based release film. The reason why this good releasability is exerted is presumed to be due to that the amount of a silicon component containing a polysiloxane component is moderately large on the outermost surface of the release film of the present embodiment.

Furthermore, as shown in the above-mentioned Table 1, it was observed that in the release film of the present embodiment, silicone was hardly transferred. This difficulty in the transfer of silicone is presumed to be due to that the modified acrylic-based resin having a polysiloxane component is contained in the resin component constituting the surface layer of the release film of the present embodiment, the acrylic-based polymer (polymer constituting the main chain) in the relevant resin exerts interaction like the anchor effect on the substrate layer, and as a result, the polysiloxane component on the outermost surface is hardly separated.

What is claimed is:

1. A release film comprising a surface layer on a substrate layer, wherein
    said surface layer contains a resin component as a main component and a crosslinking agent,
    said resin component contains a modified acrylic-based resin having a polysiloxane component as a side chain, and
    a relationship between a ratio $M_T$ (atomic %) of a content of silicon to a content of all elements existing on an outermost surface of said surface layer and a ratio $M_B$ (atomic %) of a content of silicon to a content of all elements existing at a position in a depth of 10 nm from the outermost surface of said surface layer vertically toward the substrate layer satisfies (1) and (2) below:

(i) $5 \leq M_T/M_B \leq 30$ or (ii) $M_B=0$, and (1)

$8.5 \leq M_T \leq 30$. (2)

2. The release film according to claim 1, wherein a main component of said substrate layer is at least one kind of a resin selected from the group consisting of a polyolefin resin and a polyester resin.

3. The release film according to claim 1, wherein a main component of said substrate layer is at least one kind of a resin selected from the group consisting of a polyolefin resin and a polyester resin, and
    the content of the modified acrylic-based resin having the polysiloxane component as the side chain is 50 parts by mass or less based on 100 parts by mass of the resin component constituting said surface layer.

4. The release film according to claim 1, wherein said $M_T$ satisfies $9 \leq M_T \leq 16$.

5. A laminate comprising at least a pressure-sensitive adhesive layer formed on the surface layer of the release film according to claim 1.

* * * * *